Search Room

Dec. 8, 1936. J. A. BARNES Re. 20,192

Orig. 2,097,207

MARINE TYPE SUPERHEATER BOILER

Original Filed Aug. 21, 1933 2 Sheets-Sheet 1

INVENTOR
JOHN A. BARNES
BY O. V. Thien
ATTORNEY

LIQUID HEATERS
& VAPORIZERS;
2

Search Roo

Dec. 8, 1936. J. A. BARNES Re. 20,192

MARINE TYPE SUPERHEATER BOILER

Original Filed Aug. 21, 1933 2 Sheets-Sheet 2

INVENTOR
JOHN A. BARNES
BY O. I. Thier
ATTORNEY

LIQUID HEATERS
& VAPORIZERS,
62

Search Room

Reissued Dec. 8, 1936

Re. 20,192

UNITED STATES PATENT OFFICE 20,192

MARINE TYPE SUPERHEATER BOILER

John A. Barnes, Chappaqua, N. Y., assignor to
The Superheater Company, New York, N. Y.

Original No. 2,007,267, dated July 9, 1935, Serial No. 686,047, August 21, 1933. Application for reissue March 3, 1936, Serial No. 66,878

4 Claims. (Cl. 122—462)

My invention relates to marine superheater boilers capable of giving a high degree of superheat.

The boilers in most common use at present in the marine service are of the so-called Scotch type having outer cylindrical shells, internal furnace flues, return smoke tubes and combustion chambers, connecting the furnace flues with the return tubes. In such boilers, two types of superheaters have been principally employed. One type of superheater has had the units arranged principally, if not entirely, within the return tubes, the units extending into the tubes from headers in the smoke box. The other type has had its units arranged primarily in the combustion or connecting chambers. The former type has given little difficulty in operation, but has provided only moderate degrees of superheat when restricted to the weight and surface usually considered allowable on shipboard. The latter type of superheater has given relatively high superheat, but has suffered from the difficulty that it is apt to be damaged by overheating during the period of firing up the boiler.

It is the principal object of my invention to provide a superheater arrangement for a Scotch type boiler adapted to give relatively high superheat without danger of being damaged in firing up.

The novel features of my invention are pointed out in the appended claims. The invention itself, however, together with its objects and advantages, will best be understood from the following detailed description and its accompanying drawings of a superheater boiler exemplifying the invention and selected from a number of possible embodiments thereof. In the drawings, Fig. 1 is a plan view of a Scotch marine boiler having a superheater therein in accordance with my invention, the smoke-box being omitted.

Figure 1:
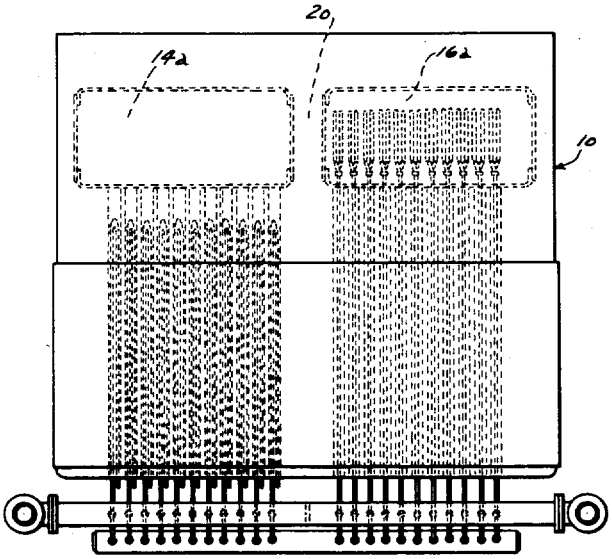
Figure 2:
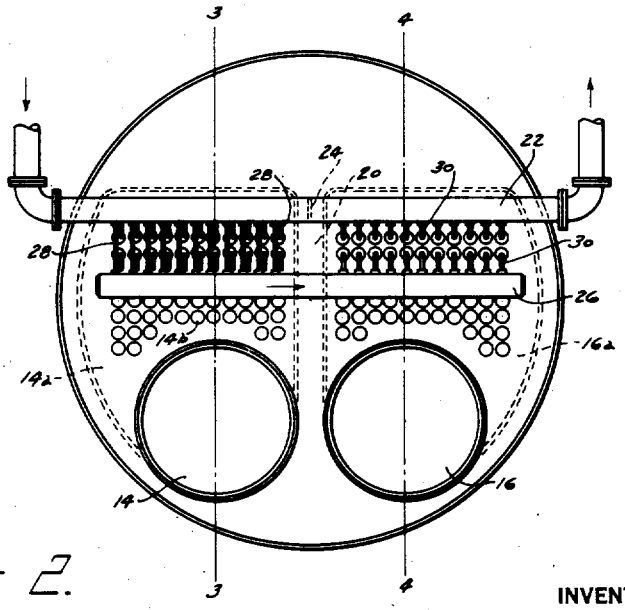
Fig. 2 is a front view of a boiler shown in Fig. 1.
Figure 3:
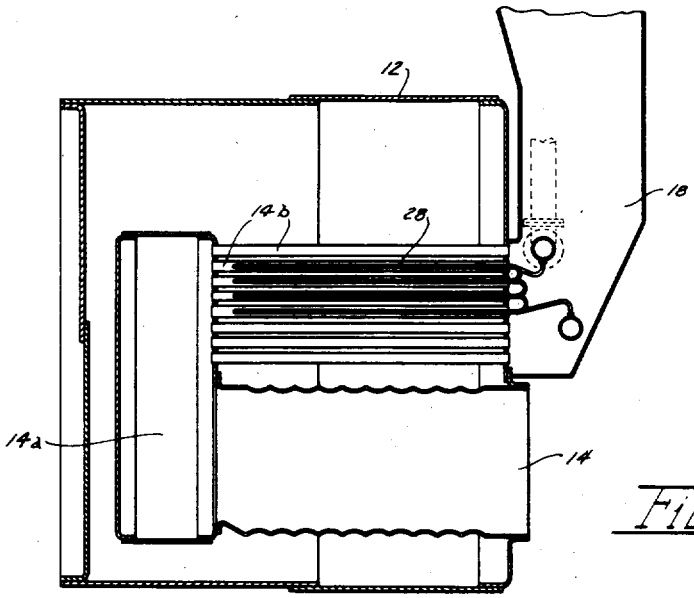
Fig. 3 is a section on a line 3—3 of Fig. 2, the smoke-box being shown.
Figure 4:
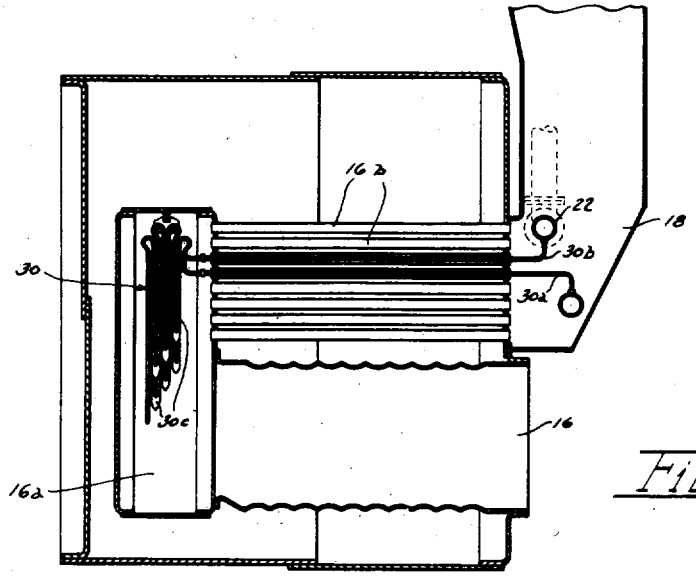
Fig. 4 is a section on a line 4—4 of Fig. 2, the smoke-box being shown.

The boiler 10 illustrated in the drawings has an outer cylindrical shell 12 and a plurality of internal furnace flues 14 and 16. The furnace flue 14 discharges rearwardly into a combustion or connecting chamber 14a which delivers the products of combustion to a group of return tubes 14b, 14b, which discharge the gases from the furnace in flue 14 into the smoke-box or uptake 18. Similarly the flue 16 discharges into a combustion character 16a which delivers the gases received by it to a group of return tubes 16b, 16b, which discharge to the uptake 18. It will be noted that the chambers 14a and 16a are entirely distinct, their adjacent walls being separated by water space 20 so that gases from one furnace do not mix with those from the other until reaching the smoke-box or up-take.

In the smoke-box 18 is a header 22 having a central partition 24 and an inlet at one end and an outlet at the other. Steam entering header 22 flows out thru a group of superheater units into a second header 26 and thence through a second group of superheater units into the header 22 again, at a point on the other side of the partition 24. The steam then flows out of the header 22 to the point of use. As illustrated, the steam from header 22 first enters a group of superheater units 28, 28 which lie in the smoke tubes 14b. Preferably, each of the units 28 has a plurality of loops, each such loop in one of the tubes 14b. The units 28, however, preferably do not extend beyond the inner ends of tubes 14b or, if so, only to a minor extent. Units 28, therefore, are protected against overheating during firing up periods by the proximity of the water cooled tubes 14b. Units 28 deliver to the intermediate header 26 from which the steam enters a group of superheater units 30, 30, each of which has an ingoing pipe 30a in one of the tubes 16b and an outgoing pipe 30b in another such tube, the pipes 30a and 30b connecting at their inner ends with loops 30c, 30c in the chamber 16a, and of which there are preferably a plurality for each unit 30. Loops 30c are arranged vertically in the chamber 16a and, in any event, they cannot pass thru tubes 16b. Breakable joints are therefore provided as shown at 31, 31 for connecting lengths 30a and 30b to loops 30c.

The major portion of the surface of units 30 is in the chamber 16a where it is subjected to high temperature gases when furnace flue 16 is in use. However, it is not necessary to heat such units except when they have steam in them, because furnace flue 14 can be used exclusively during the firing up period. Both furnace flues, of course, are used when running and the steam is raised to a high final temperature compared to that ordinarily used in marine installations due to the high rate of heat absorption in loops 30c. Such loops, however, are not damaged because of the cooling effect of the steam under running conditions.

What I claim is:

1. The combination of a return tube boiler having a plurality of completely distinct and separate internal gas paths, each of which includes a furnace flue, a group of return tubes and a vertically extending chamber for connecting the furnace flue of a given gas path with its group of return tubes, groups of superheater units each entirely within one of said gas paths, all the units in at least one of said paths lying substantially entirely within the return tubes of such path and the units in at least one of said paths having parts extending through some of the return tubes of such path and having a relatively large portion of their surface in the one of said connecting chambers.

2. The combination of a return tube boiler having a plurality of internal furnace flues, a plurality of separate combustion chambers one for each furnace flue and connected to receive the gases therefrom, groups of return tubes individual to said combustion chambers, a given furnace flue with its associated combustion chamber and groups of return tubes forming a separate gas path through the boiler, groups of superheater units connected so that the steam flows from one group to another and each group being restricted to one of said gas paths, all of the units in one gas path lying substantially entirely in the return tubes associated with such path and the units in another of said paths having parts extending through some of the return tubes associated with such path and having a relatively large portion of their surface in the combustion chamber of such path.

3. The combination of a return tube boiler having a plurality of separate gas paths therein and each such path including an internal furnace flue, a combustion chamber, and a group of return tubes, said chambers being spaced apart, a smoke box to which all the return flues deliver, a header in said smoke box having an inlet and a partition therein, a group of superheater elements connected to said header intermediate said inlet and said partition and lying substantially entirely within one group of return tubes, an intermediate header connected to receive steam from said units, a second group of superheater units connected to receive steam from said intermediate header and to deliver steam to said first header on the other side of said partition, said second group of superheater units having inlet portions and outlet portions lying within said return tubes in a gas path different from those of said first-mentioned group of units but having the major portion of its heating surface in a combustion chamber, said first header having an outlet for steam received from said second group of units.

4. The combination of a return tube boiler having a plurality of completely distinct and separate internal gas paths, each of which includes a furnace flue, a group of return tubes and a vertically extending chamber connecting the furnace flue of a given gas path with its group of return tubes, groups of superheater units each entirely within one of said gas paths, all the units in at least one of said gas paths lying substantially entirely within the return tubes of such path, and the units in at least one of said paths having a relatively large portion of their surface in the connecting chamber of such path.

JOHN A. BARNES.